US008068490B1

(12) United States Patent
Yelamanchi et al.

(10) Patent No.: US 8,068,490 B1
(45) Date of Patent: Nov. 29, 2011

(54) METHODS AND SYSTEMS FOR MULTICAST GROUP ADDRESS TRANSLATION

(75) Inventors: Swapna Yelamanchi, Sunnyvale, CA (US); Dharti Dhami, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 938 days.

(21) Appl. No.: 11/364,433

(22) Filed: Feb. 27, 2006

(51) Int. Cl.
H04L 12/28 (2006.01)
H04L 12/56 (2006.01)

(52) U.S. Cl. ............... 370/390; 370/312; 370/395.54; 370/432; 370/467

(58) Field of Classification Search ............ 370/390, 370/432, 395.54, 312, 467
See application file for complete search history.

(56) References Cited

U.S. PATENT DOCUMENTS

| | | | | |
|---|---|---|---|---|
| 5,321,693 | A * | 6/1994 | Perlman | 370/403 |
| 5,428,615 | A * | 6/1995 | Backes et al. | 370/392 |
| 5,956,335 | A * | 9/1999 | Backes et al. | 370/392 |
| 6,101,180 | A * | 8/2000 | Donahue et al. | 370/352 |
| 6,181,697 | B1 * | 1/2001 | Nurenberg et al. | 370/390 |
| 6,331,983 | B1 * | 12/2001 | Haggerty et al. | 370/400 |
| 6,741,575 | B1 * | 5/2004 | Zhang et al. | 370/329 |
| 6,847,633 | B1 * | 1/2005 | Ryu et al. | 370/352 |
| 7,012,931 | B2 * | 3/2006 | Higuchi et al. | 370/467 |
| 7,031,326 | B1 * | 4/2006 | Shur et al. | 370/401 |
| 7,203,492 | B2 * | 4/2007 | Momona | 455/432.1 |
| 7,263,099 | B1 * | 8/2007 | Woo et al. | 370/390 |
| 7,296,091 | B1 * | 11/2007 | Dutta et al. | 709/245 |
| 7,403,522 | B2 * | 7/2008 | Tsuchiya et al. | 370/390 |
| 7,443,852 | B2 * | 10/2008 | Kwon et al. | 370/390 |
| 7,450,560 | B1 * | 11/2008 | Grabelsky et al. | 370/352 |
| 7,864,769 | B1 * | 1/2011 | Woo et al. | 370/390 |
| 2002/0080720 | A1 * | 6/2002 | Pegrum et al. | 370/236 |
| 2002/0126669 | A1 * | 9/2002 | Tuck et al. | 370/390 |
| 2003/0058853 | A1 * | 3/2003 | Gorbatov et al. | 370/389 |
| 2003/0104807 | A1 * | 6/2003 | Momona | 455/422 |
| 2003/0165140 | A1 * | 9/2003 | Tang et al. | 370/393 |
| 2003/0174725 | A1 * | 9/2003 | Shankar | 370/428 |
| 2003/0223402 | A1 * | 12/2003 | Sanchez et al. | 370/351 |
| 2003/0231629 | A1 * | 12/2003 | Banerjee et al. | 370/390 |
| 2004/0100983 | A1 * | 5/2004 | Suzuki | 370/432 |
| 2004/0233907 | A1 * | 11/2004 | Hundscheidt et al. | 370/390 |
| 2005/0114656 | A1 * | 5/2005 | Liu et al. | 713/163 |

(Continued)

OTHER PUBLICATIONS

"Technology—Part 1—Address Assignment," 3 pages total, www.zerocont.sourceforge.net/zerocont-lca2003/x49.html.

(Continued)

Primary Examiner — Ayaz Sheikh
Assistant Examiner — Peter Chau
(74) Attorney, Agent, or Firm — Stolowitz Ford Cowger LLP

(57) ABSTRACT

Methods and systems for multicast group address translation are disclosed. A method includes receiving a request for data source content from a multicast group data source content requester and retrieving the data source content from the data source, where the data source content that is retrieved has associated destination addresses. Moreover, the method includes providing access to the data source content for translation of the destination addresses associated with the data source content, where the destination addresses fall within a first range of multicast group addresses. The method further includes receiving packets that have translated destination addresses that prior to translation fall within the first range of multicast addresses. The translated destination addresses fall within a second range of multicast group addresses. The packets are forwarded for forwarding to the multicast group data source content requester using the destination addresses that fall within the second range of multicast group addresses.

14 Claims, 6 Drawing Sheets

U.S. PATENT DOCUMENTS

| | | | |
|---|---|---|---|
| 2005/0249213 A1* | 11/2005 | Higuchi et al. | 370/390 |
| 2006/0140213 A1* | 6/2006 | Hwang et al. | 370/466 |
| 2006/0198394 A1* | 9/2006 | Gotoh et al. | 370/469 |
| 2007/0171930 A1* | 7/2007 | Kamata et al. | 370/432 |
| 2007/0214359 A1* | 9/2007 | Williamson | 713/163 |
| 2008/0225769 A1* | 9/2008 | Noisette et al. | 370/312 |

OTHER PUBLICATIONS www.drizzle.com, "Linklocal Multicast Name Resolution (LLMNR)," p. 1-30, www.drizzle.com/~aboda/dnsext/draft-ietf-dnsext-mdns-46.txt.

Files.multicastdns.org, Stuart Cheshire & Marc Krochmal, "Multicast DNS," p. 1-44, Jun. 7, 2005, Apple Computer, Inc., files.multicastdns.org/draft-cheshire-dnsext-multicastdns.txt.

www.cs.ucla.edu, Jon Crowcroft, "Multicast Address Translation," 6 pages total, Nov. 2001; www.cs.ucla.edu/url/hpi/aggmc/papers/draft-crowcroft-mat-00.txt.

Estrin et al.; Protocol Independent Multicast-Sparse Mode (PIM-SM): Protocol Specification; Network Working Group; Copyright Jun. 1998; 62 Pages.

* cited by examiner

METHODS AND SYSTEMS FOR MULTICAST GROUP ADDRESS TRANSLATION

TECHNICAL FIELD

Embodiments of the present invention pertain to methods and systems for multicast group address translation.

BACKGROUND ART

Internet Protocol (IP) multicast is a bandwidth conserving technology that reduces traffic by simultaneously delivering a single stream of information to thousands of corporate recipients and homes. Applications where Internet Protocol (IP) multicast can be of significant advantage include videoconferencing, corporate communications, distance learning, and distribution of software, stock quotes, and news.

It should be appreciated that IP multicast can deliver source traffic to multiple receivers without adding any additional burden on the source or the receivers and while using the least network bandwidth of any competing technology. As a part of this approach, multicast packets can be replicated in the network by a router that is enabled with supporting protocols that support the delivery of data to multiple receivers.

Global multicast addresses are allocated by the Internet authority while local multicast addresses are allocated by the system administrator of a particular domain. Packets forwarded to particular multicast group are intended to be sent to the multicast group address range that is associated with the packets.

However, in many situations it is desirable that content originated within a first multicast group address domain be carried to other multicast group address domains that are either locally scoped or that are accessible through the global Internet. In either case, a translation of addresses from a first multicast group address range to a second multicast group address range may need to be performed. It should be appreciated that this can involve translating one multicast group address range into another multicast group address range or even into a unicast address range. Current approaches do not provide effective means by which one multicast address range can be translated into another multicast address range or into a unicast address range.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, logic blocks, processing, and other symbolic representations of operations on data bits within a computer system, server system or electronic computing device. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present invention.

Figure 1A:
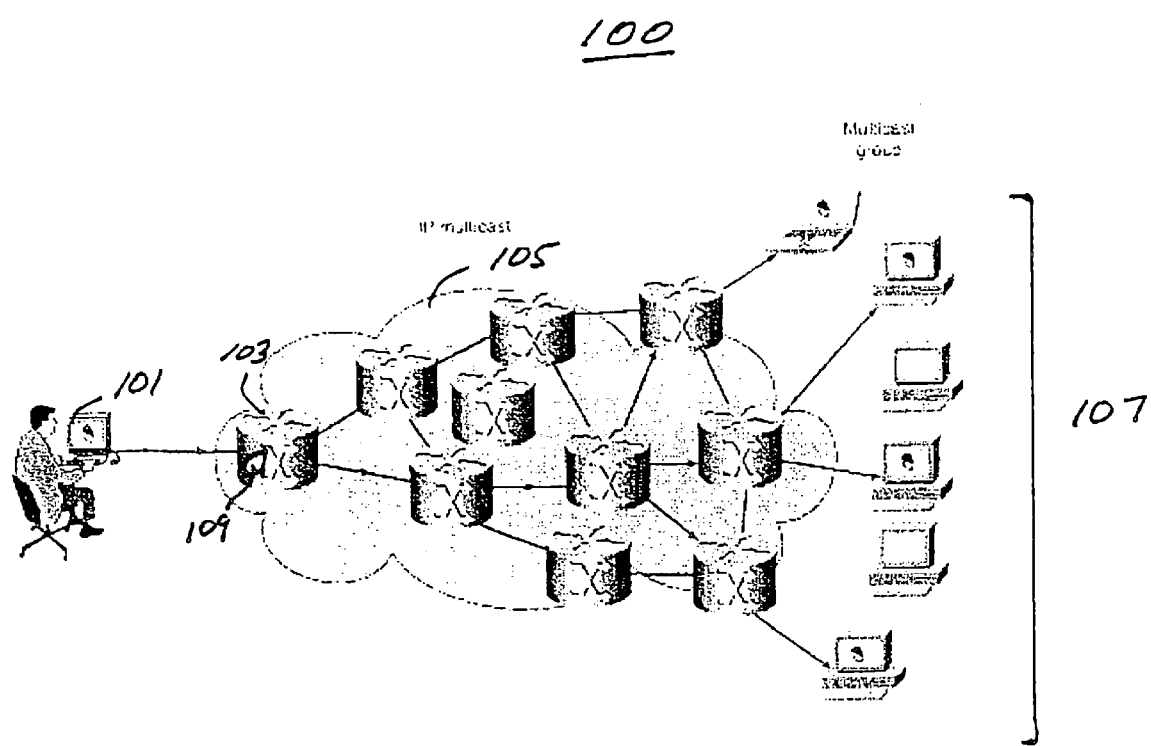
FIG. 1A shows multicast network architecture that includes a system for multicast group address translation according to one embodiment of the present invention.

Methods and Systems for Multicast Group Address Translation According to One Embodiment of the Invention FIG. 1A shows multicast network architecture 100 that includes a system for multicast group address translation 109 according to one embodiment of the present invention. In one embodiment, the system 109 for multicast group address translation can operate within a multicast network architecture such as that which is shown in FIG. 1A. The system 109 for multicast group address translation accommodates the translation of a first range of multicast group addresses into a second range of multicast group addresses. It should be appreciated that the first and second range of multicast group addresses can both be locally scoped, globally scoped, or a locally scoped range of multicast group addresses can be translated into a globally scoped range of multicast group addresses and vice versa.

More specifically, the system can accommodate the translation of a range of multicast addresses into another range of multicast addresses or into unicast addresses. FIG. 1A shows data source 101, router 103, Internet 105, multicast receivers 107 and system 109 for multicast group address translation.

Referring to FIG. 1A, data source 101 is the source of content that is desired by multicast receivers 107. Data source 101 can provide content that can include but is not limited to content generated by telephonic, video, audio, and/or textual sources etc. As such data source 101 can include but is not limited to computers, telephones, camcorders, etc.

Router 103 forwards data content from data source 101 to receivers 107 over Internet 105. In one embodiment, system 109 can reside at router 103 and can operate cooperatively with components and operations of router 103. In other embodiments, system 109 can be situated at a location that is remote from router 103 but can operate cooperatively with components and operations of router 103.

Multicast receivers 107 request and receive multicast content. In one embodiment, multicast receivers 107 can request and receive multicast content from globally scoped addresses or locally scoped addresses (content providers are associated with the addresses). In one embodiment, a content provider (e.g., data source 101) can send the content using a first range of multicast addresses that is translated into second range of multicast addresses that is used to forward the content to receivers 107.

In one embodiment, a set of requestors of content or multicast group (e.g., multicast receivers 107) associated with the first range of multicast group addresses can be identical to the set of requestors of content associated with the second range of multicast group addresses. In another embodiment, the set of requestors of content associated with the first range of multicast group addresses may not be identical to the set of requestors of content associated with the second range of multicast group addresses. In one embodiment this can occur when requestors of content either join or leave a set of requestors of content that constitute a preexisting multicast group As previously discussed, system 109 for multicast group address translation operates to accommodate the translation of a first range of multicast group addresses, associated with content multicast by content source 101, into a second range of multicast group addresses to which content is actually forwarded.

Figure 1B:
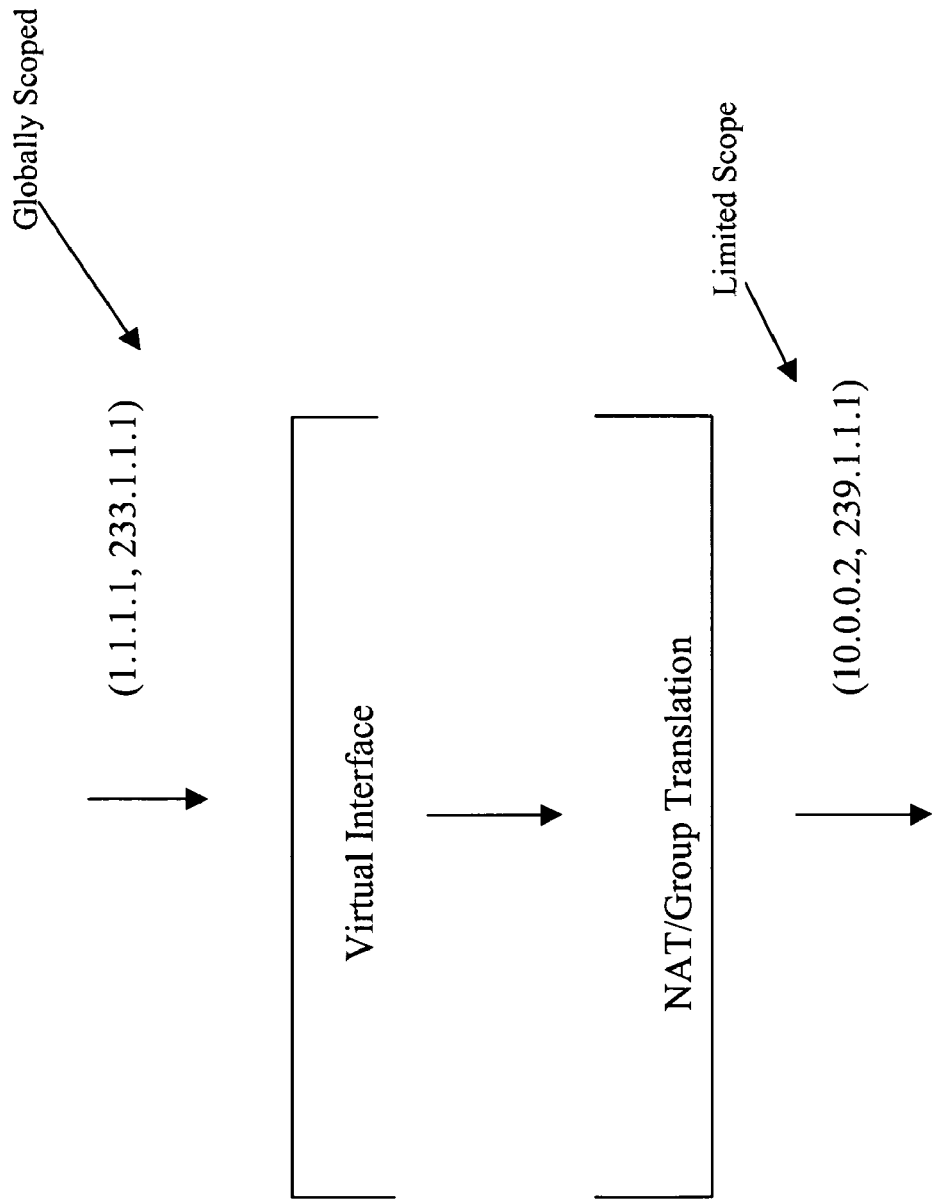
FIG. 1B illustrates the operation of a multicast group translation application according to one embodiment of the present invention.

In operation, when a request for multicast content is received by system 109 from multicast receivers 107, system 109 acts to join the multicast group constituted by multicast receivers 107. This action draws the requested content (e.g., traffic) to system 109 (e.g., a virtual interface). It should be appreciated that, in the instant example, all of the packets that are a part of the requested content can have an associated destination address that is a part of a first multicast group address range. After the requested content has been drawn to the virtual interface, it can be relayed to a translation application whereupon the first range of multicast group addresses associated with the content are translated to include destination addresses that are a part of a second multicast group address range as is shown in FIG. 1B (based on a predefined translation matrix). The requested content is then returned to system 109 and subsequently forwarded to appropriate router 103 components to be forwarded to multicast receivers 107 based on the translated range of multicast group addresses. In one embodiment, system 109 can be implemented as a virtual interface (see discussion below).

It is important to note that processes such as those described above can be used in translating a first multicast range of addresses to another multicast range of addresses where the translations involve translations from locally scoped to globally scoped addresses, locally scoped to locally scoped addresses or from globally scoped to globally scoped addresses.

As discussed above, system 109 can be seen as a virtual interface that can be employed to join the group that needs to be translated as a means of pulling traffic to the virtual interface. In one embodiment, a translation application associated with the virtual interface can maintain the translation matrix. In one embodiment, the translation matrix can record the input-interface of a packet, <g> multicast group to multicast group <gx> mapping, mask-length and the source address to be used in the reflected packet (s-new) configuration. It should be appreciated that once the packet is multicast forwarded to the virtual interface code, the virtual interface code hands the packet over to the translation matrix application which: (1) goes over all the <g> to <gx> translations, (2) does the replication of the packet when the <g>/mask-length and the input-interface (if specified in the translation matrix) of a packet matches that which is in the configuration, (3) does a group translation (depending on the configuration) on the replicated packet, and (4) hands the new multicast packet to the virtual interface (e.g., system 109).

The virtual interface forwards the packets to multicast code to forward them on the outgoing list present for the new groups. In one embodiment, the virtual interface handing back of replicated packets to the multicast code is done in the same switching context as the one in which it receives the initial packet. In one embodiment, if the sx is to be translated to some other address the source NAT (network Address Translation box) of the router can be used to perform those translations on an outgoing interface.

In exemplary embodiments, system 109 can be integrated inside a router and does not require the presence of any additional components. This arrangement provides a modular solution to multicast address translation. In one embodiment, the packets are switched out in the router fast path. This enables the performance of the router to be maintained. It should be appreciated that embodiments of the present invention can be used to pass multicast data from one multicast domain to another multicast domain across a unicast domain. Moreover, embodiments of the present invention can accommodate the translation of destination addresses from a local group address range to a global group address range.

Figure 1C:
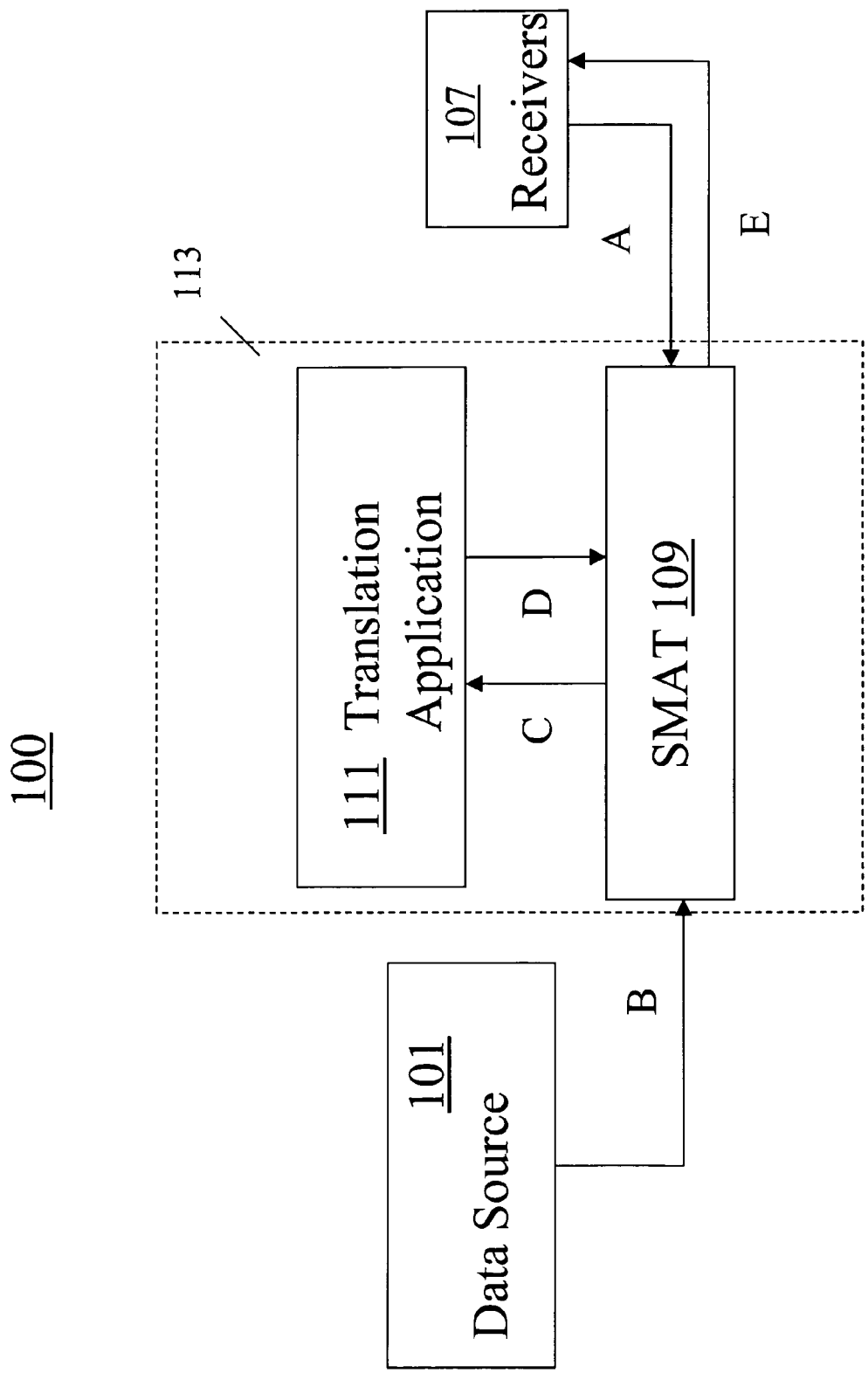
FIG. 1C illustrates operations performed in multicast group address translation according to one embodiment of the present invention.

FIG. 1C illustrates operations performed in multicast group address translation discussed above according to one embodiment of the present invention. FIG. 1C shows in addition to system 109, data source 101 and multicast receivers 107 shown in FIG. 1A, translation application 111. Referring to FIG. 1C, at A system 109 receives request for content from multicast receivers 107. At B requested content is received from data source 101. At C requested content is accessed by translation application 111. At D requested content with translated destination addresses are received at system 109. At E requested content is forwarded to multicast receivers 107.

Figure 2:
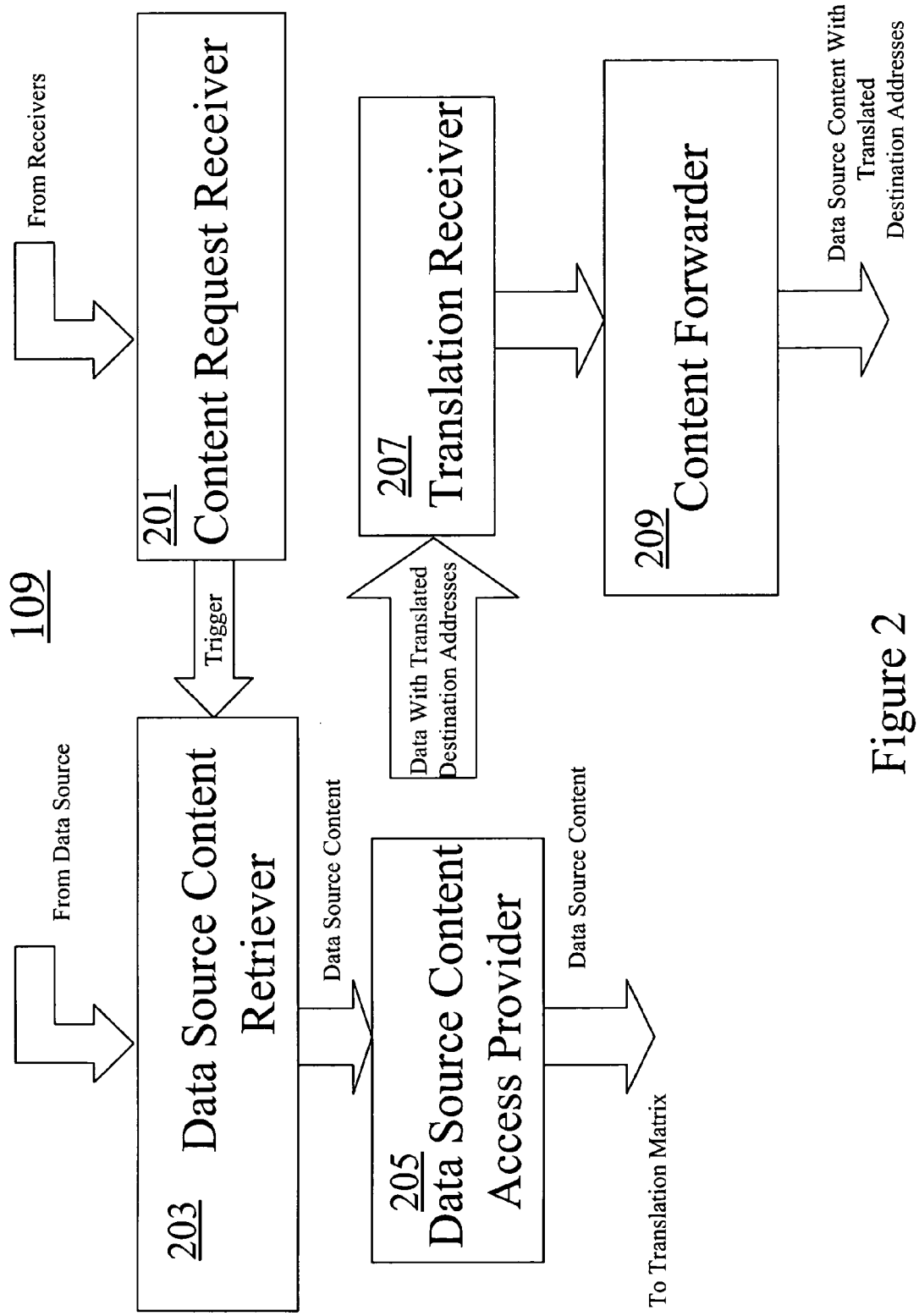
FIG. 2 shows a system for multicast group address translation according to one embodiment of the present invention.

FIG. 2 shows a system 109 for multicast group address translation according to one embodiment of the present invention. As discussed above, system 109 for multicast group address translation accommodates the translation of a first range of multicast group addresses into a second range of multicast group addresses. In the FIG. 2 embodiment, system 109 for multicast group address translation includes receiver 201, data source content retriever 203, data source content access provider 205, translation receiver 207 and content forwarder 209.

Referring to FIG. 2, receiver 201 receives request for data source content from a multicast group data source content requester. In one embodiment, the multicast group data source requester (e.g., 107 in FIG. 1A) can request data that is destined to a globally scoped range of addresses or to a locally scoped range of addresses.

Data source content retriever 203 retrieves data source content from the data source where the requested content is located. In one embodiment, the data source content retriever 203 can be implemented as a part of the system 109 virtual interface that joins the requesting multicast group and draws the requested content to itself.

Data source content access provider 205 provides access to the data source content that is retrieved by data content retriever 203. The data source content is provided to a translation application (e.g., 111 in FIG. 1C) for translation of the destination addresses associated with the data source content (based on a predefined translation matrix). It should be appreciated that in exemplary embodiments, prior to translation, the destination addresses can fall within a first range of multicast group addresses that is associated with the content that is provided by the data content source.

Translation receiver 207 receives packets with multicast destination addresses translated from a first range of multicast group addresses (to a second range of multicast group addresses). In one embodiment, a discussed above a translation matrix can be defined for the translation rules.

In one embodiment, the first range of multicast group addresses constitute destination addresses that are associated with content that is provided by the data source. And, the second range of multicast group addresses includes the translated destination addresses to which the content is actually forwarded by the router (e.g., 103 in FIG. 1A).

Content forwarder 209 forwards content to the appropriate forwarding code of the router (e.g., 103 in FIG. 1A) for forwarding to the multicast group data source content requester (e.g., 107 in FIG. 1A). In one embodiment, content is forwarded to the multicast group data content requester using the destination addresses translated to fall within the aforementioned second range of multicast group addresses.

In operation, when a request for multicast content is received by content request receiver 201 from multicast receivers (e.g., 107 in FIG. 1A), system 109 acts to join the multicast group constituted by multicast receivers 107. This action draws the requested content (e.g., traffic) to system 109 which can be implemented as a virtual interface. In one embodiment, all of the packets that are a part of the requested content can have associated destination addresses that lie within a first multicast group address range that is associated with the content. It should be appreciated that after the requested content has been drawn to system 109, it is relayed by data source content access provider 205 to a translation application (e.g., 111 in FIG. 1C) whereupon the first range of multicast group addresses are translated to a second range of multicast group addresses. The requested content is then returned to system 109 via translation receiver 207 and is subsequently sent to the appropriate router components via content forwarder 209 to be forwarded to the multicast receivers (e.g., 107 in FIG. 1A) based on the translated second range of multicast group addresses.

Exemplary Operations in Accordance with
Embodiments of the Present Invention

Figure 3:
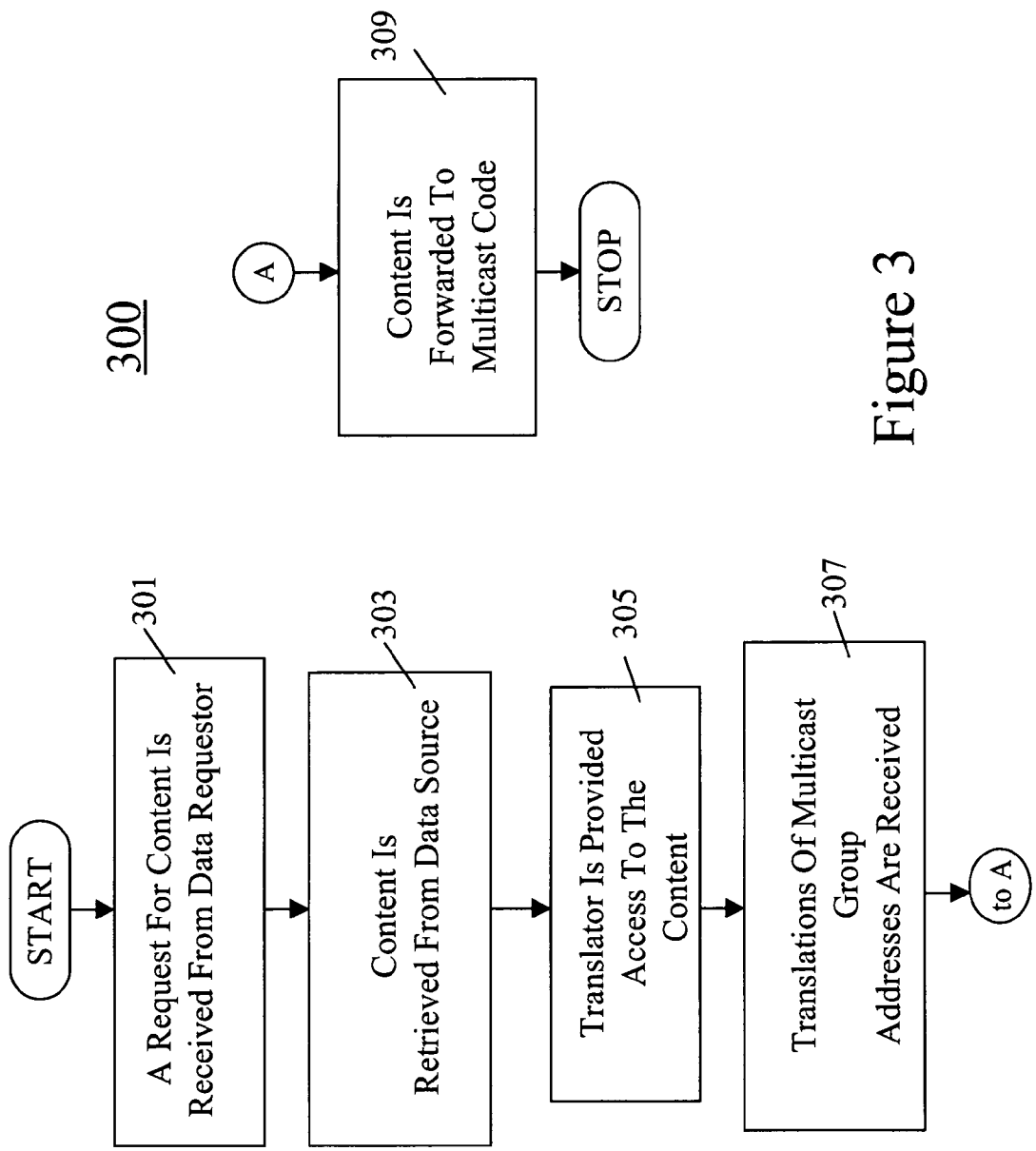
FIG. 3 shows a flowchart of the steps performed in a method for multicast group address translation according to one embodiment of the present invention.

FIG. 3 shows a flowchart of the steps performed in a method 300 for multicast group address translation according to one embodiment of the present invention. The flowcharts illustrate processes of the present invention that, in one embodiment, are carried out by processors and electrical components under the control of computer readable and computer executable instructions. The computer readable and computer executable instructions may reside, for example, in data storage features such as computer usable volatile memory and/or computer usable non-volatile memory. However, the computer readable and computer executable instructions may reside in any type of computer readable medium. Although specific steps are disclosed in these flowcharts, such steps are exemplary. That is, the present invention is well suited to performing various other steps or variations of the steps recited in FIG. 3. Within the present embodiment, it should be appreciated that the steps of the flowchart may be performed by software, by hardware or by any combination of software and hardware.

At step 301, a request for data source content is received from a multicast group data source content requester. In one embodiment, a receiver (e.g., 201 in FIG. 2) receives request for data source content from a multicast group data source content requester. In one embodiment, the multicast group data source requester (e.g., 107 in FIG. 1A) can request data that is sent to a globally scoped range of addresses or to a locally scoped range of addresses.

At step 303, content is retrieved from the data source. It should be appreciated that the content has associated destination addresses. In one embodiment, a data source content retriever (e.g., 203 in FIG. 2) retrieves the content from the data source. In one embodiment, the data source content retriever (e.g., 203 in FIG. 2) can be implemented as a part of a virtual interface that joins the requesting multicast group and draws the requested content to itself.

At step 305, access is provided to the content for transmission of the destination addresses that are associated with the content. In one embodiment, prior to translation, the destination addresses can fall within a first range of multicast group addresses. In one embodiment, data source content access provider (e.g., 205 in FIG. 2) provides access to the content that is retrieved by data content retriever (e.g., 203 in FIG. 2). It should be appreciated that the data source content is provided to a translation application (e.g., 111 in FIG. 1C) for translation of the destination addresses associated with the data source content.

At step 307, packets whose destination addresses prior to translation fall within a first range of multicast group addresses are received. In one embodiment, the packets include translated destination addresses that fall within a second range of multicast group addresses. In one embodiment, a translation receiver (e.g., 207 in FIG. 2) receives the packets whose destination addresses are translated to fall within the second range of multicast group addresses from the translation application (e.g., 111 in FIG. 1C).

At step 309, content is forwarded to multicast code for forwarding to the multicast group data source content requester using the destination addresses that fall within the second range of multicast group addresses. In one embodiment, a content forwarder (e.g., 209 in FIG. 2) forwards the content to code of the router (e.g., 103 in FIG. 1A) for forwarding to the multicast group data source content requester (e.g., 107 in FIG. 1A). In one embodiment, content is forwarded to the multicast group data source content requester using the destination addresses that fall within the translated second range of multicast group addresses.

Exemplary Hardware in Accordance with
Embodiments of the Present Invention

Figure 4:
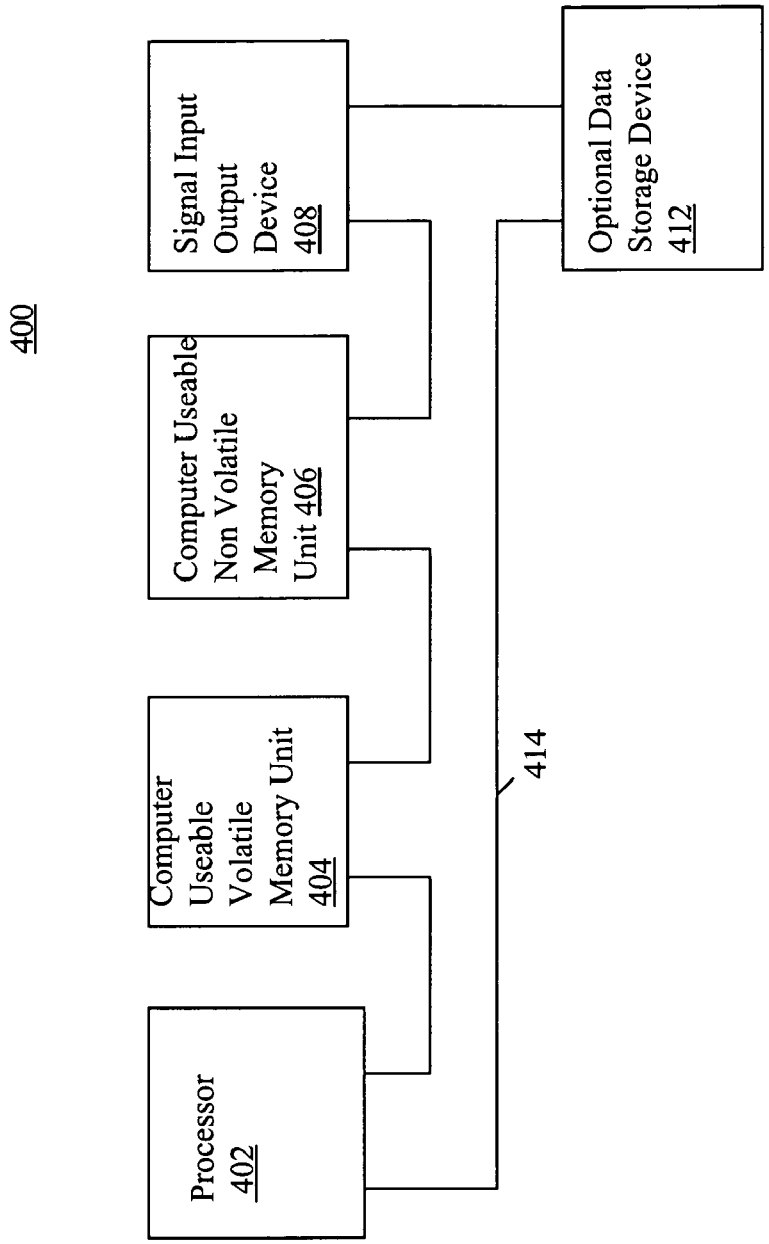
FIG. 4 is a block diagram of an exemplary computer system in accordance with embodiments of the present invention.

FIG. 4 is a block diagram of an exemplary computer system 400 in accordance with embodiments of the present invention. System 400 may be well suited to be any type of electronic computing device (e.g., server computer, embedded computing device, portable computing system etc.). Within the following discussions herein, certain processes and steps are discussed that are realized, in some embodiments, as a series of instructions (e.g., software program) that reside within computer readable memory units of computer system 400 and executed by a processor(s) of system 400. When executed, the instructions cause computer 400 to perform specific actions and exhibit specific behavior which is described in detail below. According to one embodiment, the instructions may include code that when executed perform the multicast address translations described herein (see system 109 loaded into 404 in FIG. 4).

Computer system 400 of FIG. 4 comprises an address/data bus 414 for communicating information, one or more central processors 402 coupled with bus 414 for processing information and instructions. Central processor unit 402 may be a microprocessor or any other type of processor. The computer 400 also includes data storage features such as a computer usable volatile memory unit 404 (e.g., random access memory, static RAM, dynamic RAM, etc.) coupled with bus 414 for storing information and instructions for central processor(s) 402, a computer usable non-volatile memory unit 406 (e.g., read only memory, programmable ROM, flash memory, EPROM, EEPROM, etc.) coupled with bus 414 for storing static information and instructions for processor(s) 402. System 400 also includes one or more signal generating and receiving devices 408 coupled with bus 414 for enabling system 400 to interface with other electronic devices. The communication interface(s) 408 of the present embodiment may include wired and/or wireless communication technology such as a wireless telephone circuitry. For example, in some embodiments, the communication interface 408 is a serial communication port, but could also alternatively be any of a number of well known communication standards and protocols, e.g., Universal Serial Bus (USB), Ethernet, FireWire (IEEE 1394), parallel, small computer system interface (SCSI), infrared (IR) communication, Bluetooth wireless communication, broadband, and the like.

The system 400 may also include a computer usable mass data storage device 412 such as a magnetic or optical disk and disk drive (e.g., hard drive or floppy diskette) coupled with bus 414 for storing information and instructions.

In accordance with exemplary embodiments thereof methods and systems for multicast group address translation are disclosed. A method includes receiving a request for data source content from a multicast group data source content requester and retrieving the data source content from the data source, where the data source content that is retrieved has associated destination addresses. Moreover, the method includes providing access to the data source content for translation of the destination addresses associated with the data source content, where the destination addresses fall within a first range of multicast group addresses. The method further includes receiving packets that have translated destination addresses that prior to translation fall within the first range of multicast addresses. The translated destination addresses fall within a second range of multicast group addresses. The packets are forwarded for forwarding to the multicast group data source content requester using the destination addresses that fall within the second range of multicast group addresses.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A device comprising:
a multicast address translator to receive a request for multicast data from one or more multicast receivers, wherein a content source device is configured to transmit the multicast data to a first multicast group having one or more multicast destination endpoints, and wherein the multicast address translator is configured to join the first multicast group as a multicast destination endpoint responsive to the request;
an input port to receive the multicast data from the content source device for placement on a switching context, wherein the multicast data includes a destination address of the first multicast group having the multicast address translator as a member, and wherein the multicast address translator is configured to remove the multicast data from the switching context; and
a translation matrix including a multicast group-to-multicast group mapping and multicast replication information, wherein the multicast group-to-multicast group mapping is configured to map globally-scoped multicast addresses to locally-scoped multicast addresses, wherein the multicast address translator is configured to compare the destination address of the multicast data with the multicast group-to-multicast group mapping and to compare the input port that received the multicast data with the multicast replication information, wherein the multicast address translator is configured to replicate the multicast data when the multicast data matches both the multicast group-to-multicast group mapping and the multicast replication information in the translation matrix, wherein the multicast address translator is configured to utilize the multicast group-to-multicast group mapping to determine a destination address of a second multicast group based on the destination address of the first multicast group and to translate a destination address of the replicated multicast data to the destination address of the second multicast group, and wherein the multicast address translator is configured to place the replicated multicast data with the translated destination address on the switching context for forwarding to the one or more multicast receivers associated with the request according to the translated destination address of the second multicast group.

2. The device of claim 1, wherein the multicast address translator is configured to determine the multicast data received from the data content source device is to be forwarded to the second multicasting group based, at least in part, on the destination address of received multicast data and the input port the multicast data is received.

3. The device of claim 1, wherein the one or more multicast destination endpoints in the first multicast group are not identical to the one or more multicast receivers in the second multicasting group.

4. The device of claim 1, wherein the one or more multicast destination endpoints in the first multicast group are identical to the one or more multicast receivers in the second multicasting group.

5. The device of claim 1, wherein the multicast address translator is configured to replicate the multicast data received from the content source device and to translate the destination address corresponding to the first multicasting group into a unicast destination address for forwarding across a unicast domain towards at least one of the one or more multicast receivers.

6. A method comprising:
receiving, at a multicast address translator, a request for multicast data from one or more multicast receivers, the multicast data transmitted from a content source device to a first multicast group having one or more multicast destination endpoints;
retrieving, with an input port of the multicast address translator, the multicast data from the content source device for placement on a switching context when the multicast address translator joins the first multicast group as a multicast destination endpoint responsive to the request, wherein the multicast address translator is configured to receive the multicast data as the multicast destination endpoint based on a destination address corresponding to the first multicasting group having the multicast address translator as a member, wherein the multicast address translator includes a translation matrix having multicast replication information and a multicast group-to-multicast group mapping configured to map globally-scoped multicast addresses to locally-scoped multicast addresses;
comparing the destination address of the multicast data with the multicast group-to-multicast group mapping;
determining whether the input port corresponding to the received multicast data matches the multicast replication information;
replicating, with the multicast address translator, the multicast data received from the content source device in response to the multicast data matching both at least one address in the multicast group-to-multicast group mapping and the multicast replication information in the translation matrix based on the comparing and the determining;
translating the destination address corresponding to the first multicasting group into a destination address of a second multicast group based on the multicast group-to-multicast group mapping; and
forwarding the replicated multicast data with the translated destination address to the one or more multicast receivers associated with the request according to the destination address of the second multicast group by placing the replicated multicast data in the switching context.

7. The method of claim 6, further comprising determining the multicast data received from the data content source device is to be forwarded towards a unicast domain based, at least in part, on the destination address of received multicast data and the input port the multicast data is received.

8. The method of claim 6, wherein the one or more multicast destination endpoints in the first multicast group are not identical to the one or more multicast receivers.

9. The method of claim 6, wherein the one or more multicast destination endpoints in the first multicast group are identical to the one or more multicast receivers.

10. The method of claim 6, further comprising:
replicating the multicast data received from the content source device;
translating the destination address corresponding to the first multicasting group into a unicast destination address; and
forwarding across a unicast domain towards at least one of the one or more multicast receivers.

11. A system comprising:
means for receiving, at a multicast address translator, a request for multicast data from one or more multicast receivers, the multicast data transmitted from a content source device to a first multicast group having one or more multicast destination endpoints;
an input port to receive the multicast data from the content source device for placement on a switching context when the multicast address translator joins the first multicast group as a multicast destination endpoint responsive to the request, wherein the multicast address translator is configured to receive the multicast data as the multicast destination endpoint based on a destination address corresponding to the first multicasting group having the multicast address translator as a member, wherein the multicast address translator includes a translation matrix having a multicast group-to-multicast group mapping and other information related to the multicast data, wherein the multicast group-to-multicast group mapping is configured to map globally-scoped multicast addresses to locally-scoped multicast addresses;
means for replicating the multicast data received from the content source device, wherein the means for replicating is configured to compare the destination address of the multicast data with the multicast group-to-multicast group mapping, determine whether the input port matches the other information related to the multicast data, replicate the multicast data in response to the multicast data matching both the multicast group-to-multicast group mapping and the other information related to the multicast data in the translation matrix based on the comparison and the determination, and translate the destination address corresponding to the first multicasting group into another destination address corresponding to a second multicasting group based on the multicast group-to-multicast group mapping; and
means for forwarding the replicated multicast data with the translated destination address to the one or more multicast receivers associated with the request according to the destination address corresponding to the second multicast group.

12. The system of claim 11, further comprising means for determining the multicast data received from the data content source device is to be forwarded to the second multicasting group based, at least in part, on the destination address of received multicast data and the input port the multicast data is received.

13. The system of claim 11, wherein the one or more multicast destination endpoints in the first multicast group are not identical to the one or more multicast receivers in the second multicasting group.

14. The system of claim 11, further comprising:
means for replicating the multicast data received from the content source device;
means for translating the destination address corresponding to the first multicasting group into a unicast destination address; and
means for forwarding across a unicast domain towards at least one of the one or more multicast receivers.

* * * * *